United States Patent
Craske (10) Patent No.: US 11,755,243 B2
(45) Date of Patent: Sep. 12, 2023

(54) APPARATUS AND METHOD FOR TRIGGERING ACTION

(71) Applicant: Arm Limited, Cambridge (GB)

(72) Inventor: Simon John Craske, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/056,944

(22) PCT Filed: May 2, 2019

(86) PCT No.: PCT/GB2019/051219
§ 371 (c)(1),
(2) Date: Nov. 19, 2020

(87) PCT Pub. No.: WO2019/229412
PCT Pub. Date: Dec. 5, 2019

(65) Prior Publication Data
US 2021/0216244 A1    Jul. 15, 2021

(30) Foreign Application Priority Data
May 31, 2018 (GB) ..................... 1808888

(51) Int. Cl.
*G06F 3/06* (2006.01)
*G06F 11/10* (2006.01)

(52) U.S. Cl.
CPC .......... *G06F 3/0659* (2013.01); *G06F 3/0604* (2013.01); *G06F 3/0673* (2013.01); *G06F 11/1076* (2013.01)

(58) Field of Classification Search
CPC .... G06F 3/0659; G06F 3/0604; G06F 3/0673; G06F 11/1076
See application file for complete search history.

(56) References Cited

U.S. PATENT DOCUMENTS 5,737,546 A * 4/1998 Fenwick ............. G06F 13/4213
710/110
5,926,819 A * 7/1999 Doo .................. G06F 16/24565
707/999.102

(Continued)

FOREIGN PATENT DOCUMENTS

GB    2541714    3/2017
GB    2544996    6/2017

(Continued)

OTHER PUBLICATIONS

International Search Report and Written Opinion of the ISA for PCT/GB2019/051219, dated Jul. 23, 2019, 15 pages.

(Continued)

*Primary Examiner* — Prasith Thammavong
(74) *Attorney, Agent, or Firm* — NIXON & VANDERHYE P.C.

(57) ABSTRACT

An apparatus and method are provided for triggering action performance. One example apparatus comprises memory access circuitry to retrieve a data value from a memory location of a memory. The apparatus further comprises action triggering circuitry to determine whether the data value is to be interpreted according to a first interpretation or a second interpretation and, when it is determined that the data value is to be interpreted according to the second interpretation, determine whether the data value defines an action to be performed. When it is determined that the data value defines an action to be performed, the action triggering circuitry is to trigger performance of the action.

17 Claims, 9 Drawing Sheets

(56) References Cited

U.S. PATENT DOCUMENTS

| | | | | |
|---|---|---|---|---|
| 6,532,389 | B1* | 3/2003 | Shahandeh | A61N 1/37 607/27 |
| 6,557,119 | B1* | 4/2003 | Edwards | G06F 11/3648 717/124 |
| 10,320,813 | B1* | 6/2019 | Ahmed | H04L 63/1416 |
| 2006/0294432 | A1 | 12/2006 | Thelen | |
| 2007/0226471 | A1* | 9/2007 | Kapustin | G06F 11/3648 714/E11.207 |
| 2009/0037703 | A1 | 2/2009 | Burdick et al. | |
| 2009/0254833 | A1* | 10/2009 | McLaughlin | H04L 41/22 715/737 |
| 2009/0254883 | A1* | 10/2009 | Munson | G06F 11/3624 717/124 |
| 2009/0282304 | A1* | 11/2009 | Piry | G06F 11/3648 714/718 |
| 2018/0069658 | A1* | 3/2018 | Benisty | G06F 11/00 |
| 2021/0034503 | A1* | 2/2021 | Williams | G06F 11/3656 |
| 2021/0064547 | A1* | 3/2021 | Chhabra | G06F 11/1068 |

FOREIGN PATENT DOCUMENTS

| | | |
|---|---|---|
| GB | 2553311 | 3/2018 |
| JP | 2008-65834 | 3/2008 |
| JP | 2015-114862 | 6/2015 |
| JP | 2018-536238 | 12/2018 |

OTHER PUBLICATIONS

Office Action for JP Application No. 2020-565317 dated Apr. 18, 2023 and English translation, 5 pages.

\* cited by examiner

FIG. 1

A) SET  PR1 = 140000  ⟶ trigger error

B) SET  PR1 = 140000

LD  R5,  PR1  ⟶ trigger error

APPARATUS AND METHOD FOR TRIGGERING ACTION

This application is the U.S. national phase of International Application No. PCT/GB2019/051219 filed 2 May 2019, which designated the U.S. and claims priority to GB Patent Application No. 1808888.0 filed 31 May 2018, the entire contents of each of which are hereby incorporated by reference.

The presented technique relates to the field of data processing.

Some data processing apparatuses allow for watchpoints to be configured to trigger an action to be performed when a certain memory access is made, for example for use in debugging or detecting memory usage errors. Watchpoints may be associated with a storage of the data processing apparatus, in which data values are stored in addressable storage locations. An example of such a watchpoint is a data watchpoint, which causes an action to be triggered when a particular data value is loaded from the storage. Another example is an address watchpoint, which causes an action to be triggered when a particular storage address is accessed.

Despite their utility, the above-described watchpoints have disadvantages. A data value associated with a data watchpoint cannot be used to represent normal data in cases when the watchpoint action is not intended to be performed when accessing the normal data. The configuring of data watchpoints therefore restricts the number of data values that can be used to represent normal data. In the case of address watchpoints, a comparator is typically required for each address watchpoint that is to be configured. Providing a large number of address comparators for address watchpoints can be expensive in hardware, so in practice the number of addresses for which address watchpoints can be established simultaneously can be limited.

In one example configuration, there is provided an apparatus comprising: memory access circuitry to retrieve a data value from a memory location of a memory; and action triggering circuitry to: determine whether the data value is to be interpreted according to a first interpretation or a second interpretation; and when it is determined that the data value is to be interpreted according to the second interpretation: determine whether the data value defines an action to be performed; and when it is determined that the data value defines an action to be performed, trigger performance of the action.

In another example configuration, there is provided a method comprising: retrieving a data value from a memory location of a memory; determining whether the data value is to be interpreted according to a first interpretation or a second interpretation; and when it is determined that the data value is to be interpreted according to the second interpretation: determining whether the data value defines an action to be performed; and when it is determined that the data value defines an action to be performed, triggering performance of the action.

In a further example, there is provided a computer program for controlling a host data processing apparatus to provide an instruction execution environment for execution of instructions of target program code, comprising: memory access program logic to request a data value from a memory location of a memory; and action triggering program logic to: determine whether the data value is to be interpreted according to a first interpretation or a second interpretation; and when it is determined that the data value is to be interpreted according to the second interpretation: determine whether the data value defines an action to be performed; and when it is determined that the data value defines an action to be performed, trigger performance of the action. A storage medium may store the computer program described above. The storage medium may be a non-transitory storage medium.

The present technique will be described further, by way of illustration only, with reference to examples thereof as illustrated in the accompanying drawings, in which.

Data processing apparatuses according to examples of the present disclosure allow a data value, stored in a given memory location, to be interpreted according to different interpretations.

As an example of a system allowing such different interpretations, apparatuses may support bounded pointers wherein a pointer indicating a particular address is associated with range information indicating an allowable range of addresses in which the pointer may be dereferenced. For example, such pointers may be referred to as "fat pointers". In addition to range information, such bounded pointers may also have other associated attributes, defining one or more restrictions/permissions on the use of the pointer. Such bounded pointers with permissions are often called "capabilities" and use of such bounded pointers can hence provide strong security, by placing constraints on how the pointer value specified by the bounder pointer is used. In such data processing apparatuses, the contents of a given memory location may interpreted either as a capability or as data.

In examples of the present disclosure, this data functionality is extended by providing for a given data value, when interpreted according to a particular interpretation such as a non-data interpretation, to define an action to be performed. In examples, the action is encoded within data value space that is redundant for the interpretation in question. For example, this interpretation may utilise some, but not all, of the available data values. At least some of the remaining data values, which are not utilised for the second interpretation, can then be used to encode the action to be performed. In this manner, watchpoint-type functionality can be implemented without reducing the available data value space for the data interpretation: the full range of data values are still available. The above-described disadvantage of data watchpoints is thus averted. Furthermore, dedicated address comparators are not required for each address to be monitored, thereby averting the above-described disadvantage of address watchpoints.

As noted above, an example apparatus comprises memory access circuitry to retrieve a data value from a memory location of a memory. The apparatus comprises action triggering circuitry to determine whether the data value is to be interpreted according to a first interpretation or a second interpretation. In examples, the first interpretation is that the data value is data and the second interpretation is that the data value is non-data, such as metadata. When it is determined that the data value is to be interpreted according to the second interpretation, the action triggering circuitry determines whether the data value defines an action to be performed. When it is determined that the data value defines an action to be performed, the action triggering circuitry triggers performance of the action. The apparatus thus provides for a data value, which is to be interpreted according to the second interpretation, to define an action to be performed. Hence, this enables a potentially large number of addresses to be monitored for accesses potentially triggering the action, without requiring many address comparators and without reducing the encoding space available for data in the first interpretation. This can be particularly useful for detecting certain classes of memory usage errors (such as out-of-bounds violations, use-after-free errors, etc., where the number of memory addresses which could potentially be accessed incorrectly may be relatively high, making it impractical to catch such errors using address watchpoints).

In examples, the action is an error mitigation action which may for example comprise signalling an exception. This can be used as a "canary" to protect against undesired or unauthorised loads from particular memory regions.

Alternatively or additionally, the action may comprise updating a diagnostic record, such as by incrementing a counter or storing a log file. This enables keeping track of loads from particular memory regions without necessitating signalling an exception and halting execution flow.

The action may comprise returning a different data value from a different memory location. This allows the action to be performed whilst also returning a desired data value. For example, as described in more detail below, a freed memory location can be overwritten with a data value defining an action, whilst the data value that was originally stored in that memory location is stored in another memory location. When that memory location is accessed, the action can be performed and the data value from the other memory location can be returned. This allows, for example, a record to be kept of loads from freed memory locations whilst still returning the expected data, thereby allowing the presently defined apparatus to be implemented transparently, without impeding the execution of code that is not specifically written for the present apparatus.

In examples, the data value retrieval and associated action are performed in response to an attempted write to the memory location and the action comprises determining whether the write is actually performed.

In related examples, the action comprises determining that a processor operating state associated with an attempted write to the memory location is a prohibited operating state and, in response to the determining that the operating state is the prohibited operating state, prohibiting the attempted write. The operating state may be at least one execution privilege level. Such prohibiting of writes from particular privilege levels allows control of which processes can overwrite the data value. For example, accidental overwrites of the data value, by processes other than the process that set the data value, can be prevented.

In examples, the above-described data value retrieval, and associated performance of the action, are performed in response to an attempted write to the memory location. The action may, in such examples, include determining whether the attempted write is actually performed. For example, this allows the action to be based on whether a prohibited write was attempted.

In examples, the action triggering circuitry is to determine whether the data value is to be interpreted according to the first interpretation or the second interpretation based on a control value associated with the memory location. For example, the control value may be a tag bit. The control value may be stored in a control value memory location within a region of the memory allocated for control value storage. Alternatively, the control value may be stored in a control value memory location associated with the memory location, such as adjacent to the memory location. The location of the control value storage can thus be determined based on the requirements and restrictions of a particular system.

In examples, the action triggering circuitry is to trigger the action when the data value at least partially matches one of one or more predefined values. For example, as described above, the action may be defined by way of redundancy in data values according to the second interpretation, such that particular predefined values are not utilised for the second interpretation. Such predefined data values can then be used to define the action to be performed.

Some processing apparatuses may support the use of bounded pointers. The pointer itself may point to, or be used to determine, the address of a data value to be accessed or an instruction to be executed, for example. However, the pointer may also have associated range information which indicates an allowable range of addresses when using the pointer. This can be useful for example for ensuring that the address determined from the pointer remains within certain bounds to maintain security or functional correctness of behaviour. For example, there is increasing interest in capability-based architectures in which certain capabilities are defined for a given process, and an error can be triggered if there is an attempt to carry out operations outside the defined capabilities. The range information for a bounded pointer may be part of the capability information defined for such an architecture, and within a capability-based architecture such a bounded pointer (including its associated capability information) may be referred to as a capability.

Hence, an apparatus may have storage elements used to store a pointer having associated range information indicative of an allowable range of addresses when using the pointer. Each bounded pointer storage element could be a register, or a memory location in general purpose memory, for example a location on a stack memory.

Certain instructions can be used to reference such a bounded pointer storage element in order to obtain a pointer which is then used to derive an address in memory required during operation of the instruction. The pointer may be used directly to identify the memory address, or may be used to derive the memory address, for example by the addition of an offset to the pointer value.

As noted above, in examples the first interpretation is that the data value is data. In related examples, the second interpretation is that the data value is metadata. The metadata may for example relate to a data value stored in a further memory location different from the memory location in which the metadata is stored. The data value stored in the further memory location may be interpreted according to the first interpretation. In examples in which the use of bounded pointers is supported, the data value stored in the further memory location may comprise a pointer value of a bounded pointer, and the metadata may then comprise bounds for the bounded pointer. In some such examples, the action triggering circuitry is to determine that the pointer value is outside the bounds and, in response to determining that the pointer value is outside the bounds, signal an exception. In this way, the data processing functionality of a system that supports use of capabilities can be extended to provide for triggering of actions as described elsewhere herein.

In other examples in which the second interpretation is that the data value is metadata, the metadata is an error correcting code associated with the data stored in the further memory location. In this way, the data processing functionality of a system that supports use of error correcting codes can be extended to provide for triggering of actions as described elsewhere herein.

Particular examples will now be described with reference to the Figures.

Figure 1:
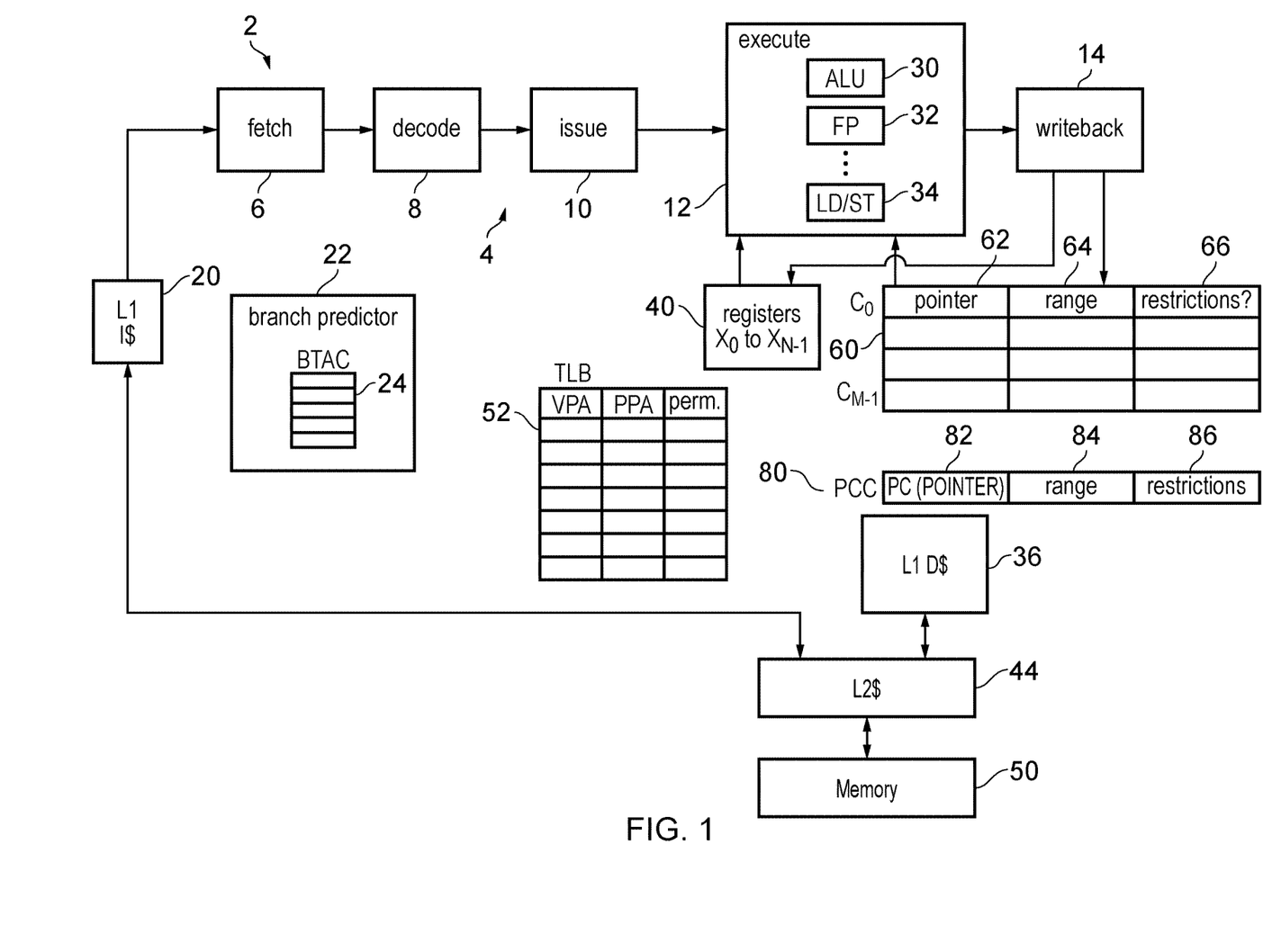
FIG. 1 is a block diagram of an apparatus in accordance with one example arrangement.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some implementations. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some implementations may support in-order processing so that instructions are issued for execution in an order corresponding to the program order in which instructions were fetched from the L1 instruction cache 20. Other implementations may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some implementations, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one implementation the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an example where the same physical storage is used for both general purpose data registers and bounded pointer registers, then in one implementation the pointer value 62 may for example be stored within the same storage location as used for a corresponding general purpose register.

Figure 2:
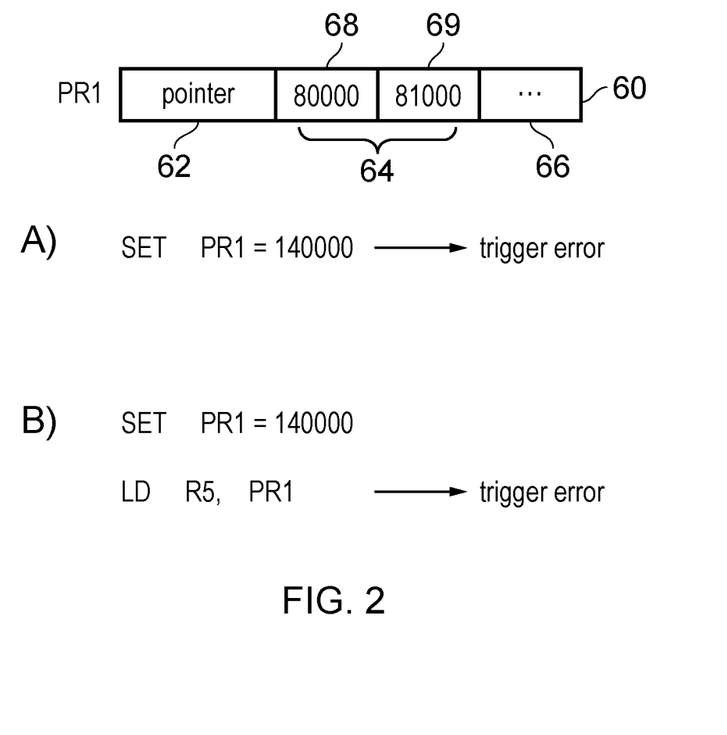
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Figure 3:
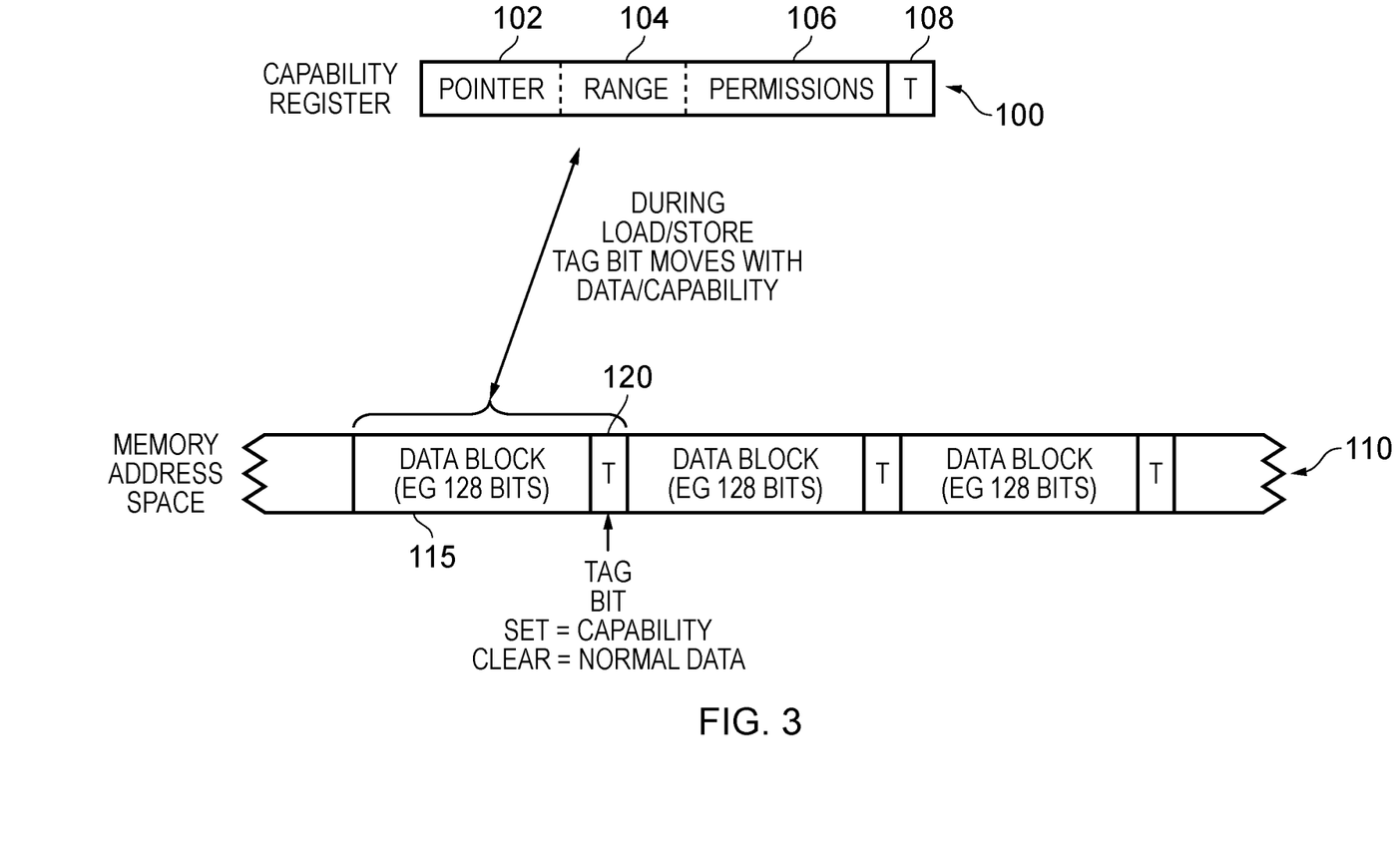
FIG. 3 illustrates the use of a tag bit in association with bounded pointers, in accordance with one example arrangement.

FIG. 3 schematically illustrates how a tag bit is used in association with individual data blocks to identify whether those data blocks are to be interpreted according to a first interpretation or a second interpretation. In this example, the first interpretation is that a data block is to be interpreted as normal data, and the second interpretation is that a data block is to be interpreted as representing a capability (i.e. a bounded pointer and associated restrictions information). In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block is to be interpreted as non-data, for example as a capability (i.e. interpreted according to the second interpretation), and is cleared to indicate that the associated data block represents normal data (i.e. interpreted according to the first interpretation). It will be appreciated that the actual value associated with the set or the clear state can vary dependent on implementation, but purely by way of illustration, in one example if the tag bit has a value of 1, it indicates that the associated data block is to be interpreted as non-data, and if it has a value of 0 it indicates that the associated data block contains normal data.

In the present example the second, non-data, interpretation is that a data block contains a capability. When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

When the tag bit indicates that a given data block represents a capability, the data block can define an action to be performed. In examples, this is encoded within redundant space in the data block. For example, particular data values may not be required for defining capabilities. Such values can then be used to define one or more actions to be performed.

Figure 4:
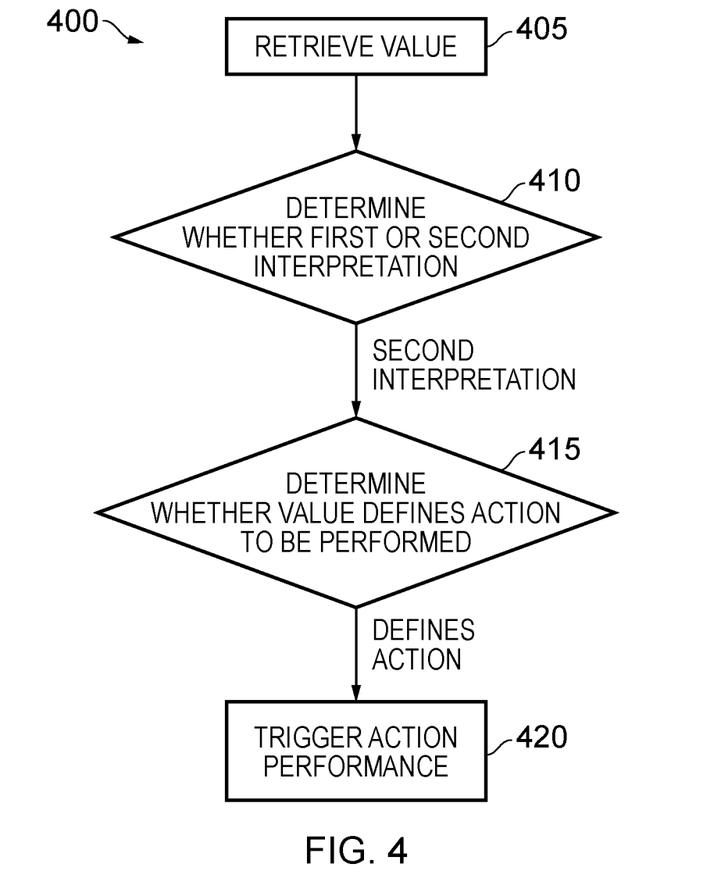
FIG. 4 shows schematically a method according to an example.

FIG. 4 shows schematically a method 400 according to an example of the present disclosure. The method 400 may for example be implemented in general processing circuitry or in specialised circuitry configured specifically to implement the method 400.

At block 405, a data value is retrieved from a memory location of a memory, for example as described above in relation to FIG. 1.

At block 410, it is determined whether to interpret the data value according to a first interpretation or a second interpretation. As described above, in examples the first interpretation is that the data value corresponds to data and the second interpretation is that the data value corresponds to a capability. For example, the determination of block 410 may be based on a tag bit associated with the data value, as described above in relation to FIG. 3.

If it is determined at block 410 that the data is to be interpreted according to the second interpretation, flow proceeds to block 415.

At block 415, it is determined whether the data value defines an action to be performed. Particular examples of such actions, and how they could be encoded within the data value, are described elsewhere in the present disclosure. For example, the action may be an error mitigation action.

If it is determined at block 415 that the data value defines an action to be performed, flow proceeds to block 420.

At block 420, the action is performed.

The method 400 thereby provides for a given data value to be interpreted according to different interpretations and, furthermore, for data values that are indicated as corresponding to the second interpretation to trigger performance of an action. For example, as described elsewhere herein, the action to be performed may be defined by taking advantage of redundancy by utilising data values that not otherwise required by the second interpretation. In this manner, the data processing functionality of the system is increased without requiring additional storage to represent whether the action is to be performed.

As noted above, the action to be performed may be an error mitigation action. For example, the action may comprise updating a diagnostic record, for example by storing or updating a log file, or incrementing a counter. Alternatively or additionally, the action may comprise returning a data value from a different memory location than the originally-accessed memory location. An example of such an action will now be described with reference to FIGS. 5A-5E.

Figure 5A:
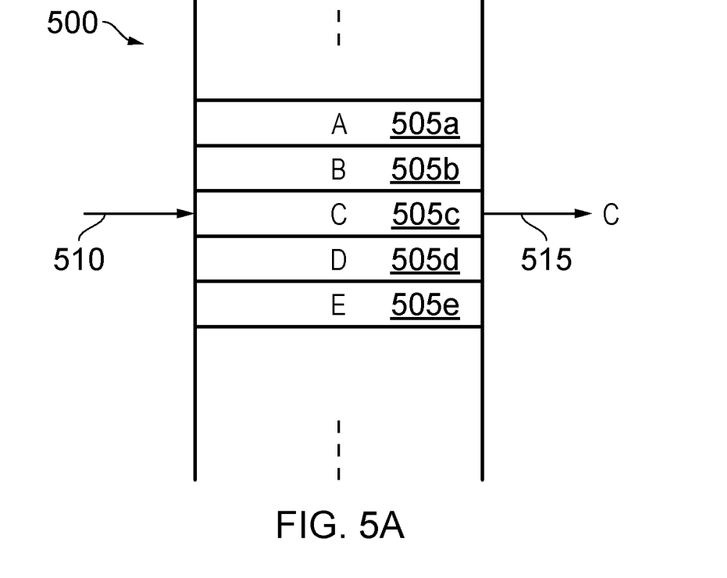
FIGS. 5A-5E illustrate an error mitigation algorithm according to an example.

FIG. 5A shows schematically a memory 500 of a comparative system in which methods of the present disclosure are not implemented such that data values can be interpreted according to a first, data, interpretation or a second, non-data, interpretation, but data values according to the second interpretation do not define actions to be performed.

The memory 500 comprises data values A-E in memory locations 505a-505e. A retrieval request 510 is directed at the memory location 505c, and the data value C is retrieved in a retrieval 515.

Figure 5B:
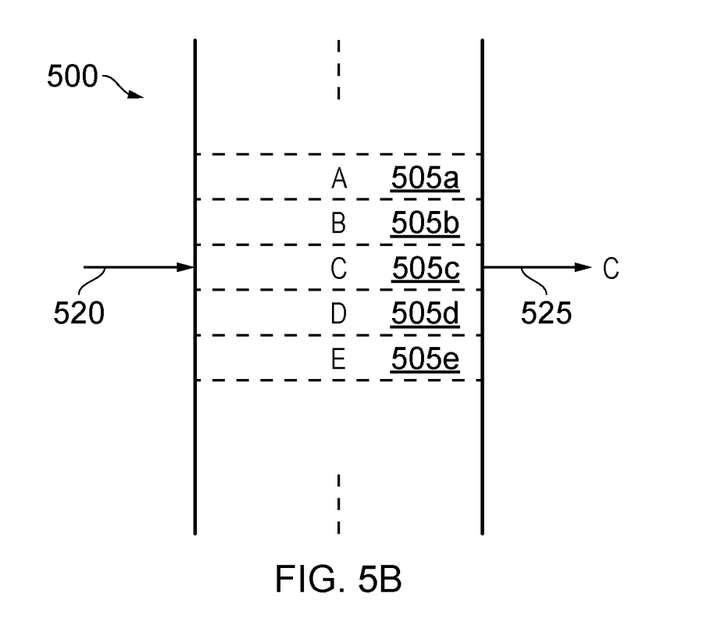

FIG. 5B shows schematically the memory 500 following freeing of the memory locations 505a-505e. Although the memory locations 505a-505e have been freed (indicated by their delineation with dashed lines), the data values A-E have not been overwritten and so the memory locations 505a-505e still contain the data values A-E.

A retrieval request 520 is directed at the memory location 505c. If this retrieval request is not prevented (for example by a system process that prevents access to freed memory locations), the data value C will be retrieved in a retrieval 525. In some systems this behaviour is desirable, for example to allow execution flow to proceed rather than causing a crash.

Figure 5C:
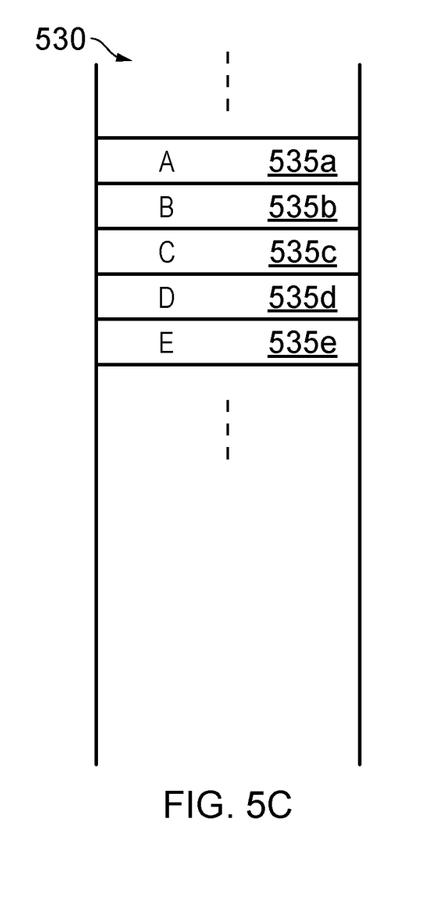

FIG. 5C shows schematically a memory 530 according to examples of the present disclosure. The memory comprises memory locations 535a-535e, which contain data values A-E respectively such that memory 530 has the same configuration as the memory 500 of FIG. 5A.

Figure 5D:
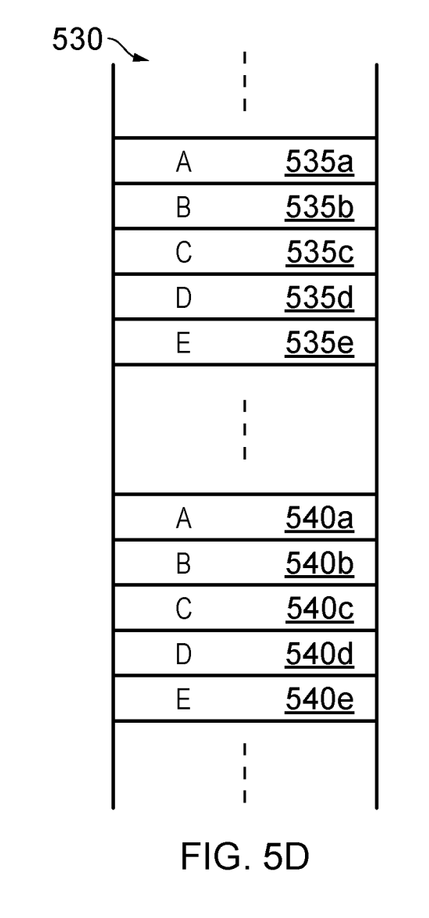

FIG. 5D shows schematically the memory 530 following a first step of a process of freeing the memory locations 535a-535e. The contents of the memory locations 535a-535e (i.e. the data values A-E) are copied to a different set of memory locations 540a-540e.

Figure 5E:
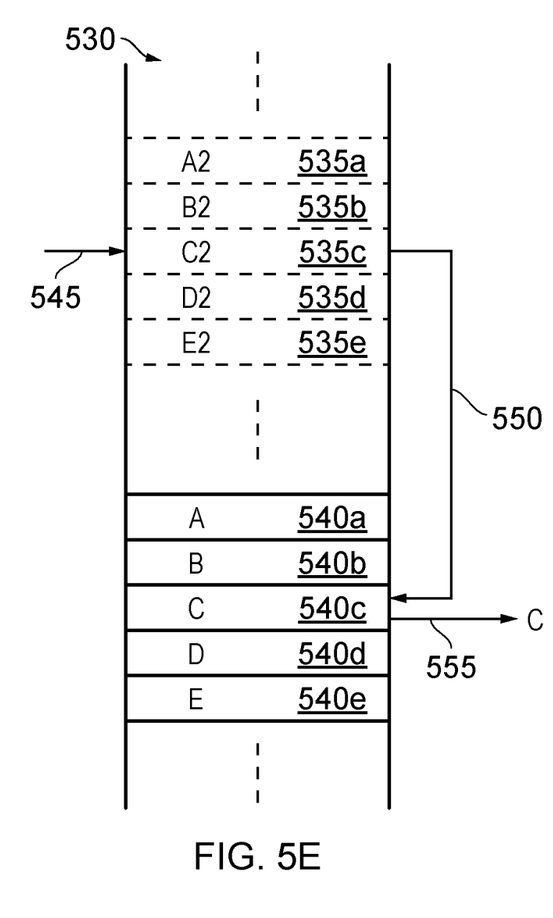

FIG. 5E shows schematically the memory 530 following completion of the process of freeing the memory locations 535a-535e. Further data values A2-E2 have been written to the memory locations 535a-535e, following which the memory locations 535a-535e have been freed (indicated by their delineation with dashed lines).

An indication is stored that the further data values A2-E2 are data values that are to be interpreted according to a non-data interpretation, for example by way of a tag bit associated with each of the memory locations 535a-535e as described elsewhere herein. In the present example, each data value 535a-535e identifies the corresponding memory location 540a-540e into which its original contents was copied, and also defines an error mitigation action as described elsewhere herein. For example, the corresponding memory location 540a-540e may be identified by way of an offset from the memory location 535a-535e.

A retrieval request 545 is directed to freed memory location 535c. It is determined that the data value C2 does not represent data but instead identifies a corresponding memory location 540c and also defines an error mitigation action. Based on this, the contents of the corresponding memory location 540c, i.e. the data value C, is identified in an identification 550. The data value C is retrieved in a retrieval 555 and the error mitigation action is performed. In this manner, the error mitigation is defined and performed without preventing retrieval of the data value C. Execution can thus proceed based on the data value C in the same manner as described above in relation to FIGS. 5A-5B, whilst providing for the error mitigation action to be performed. Error mitigation functionality can thus be implemented transparently such that, apart from the actual performance of the error mitigation action, the flow of execution remains unchanged from comparative systems such as that of FIGS. 5A-5B. The error mitigation can thus be implemented without negatively impacting user experience.

Figure 6:
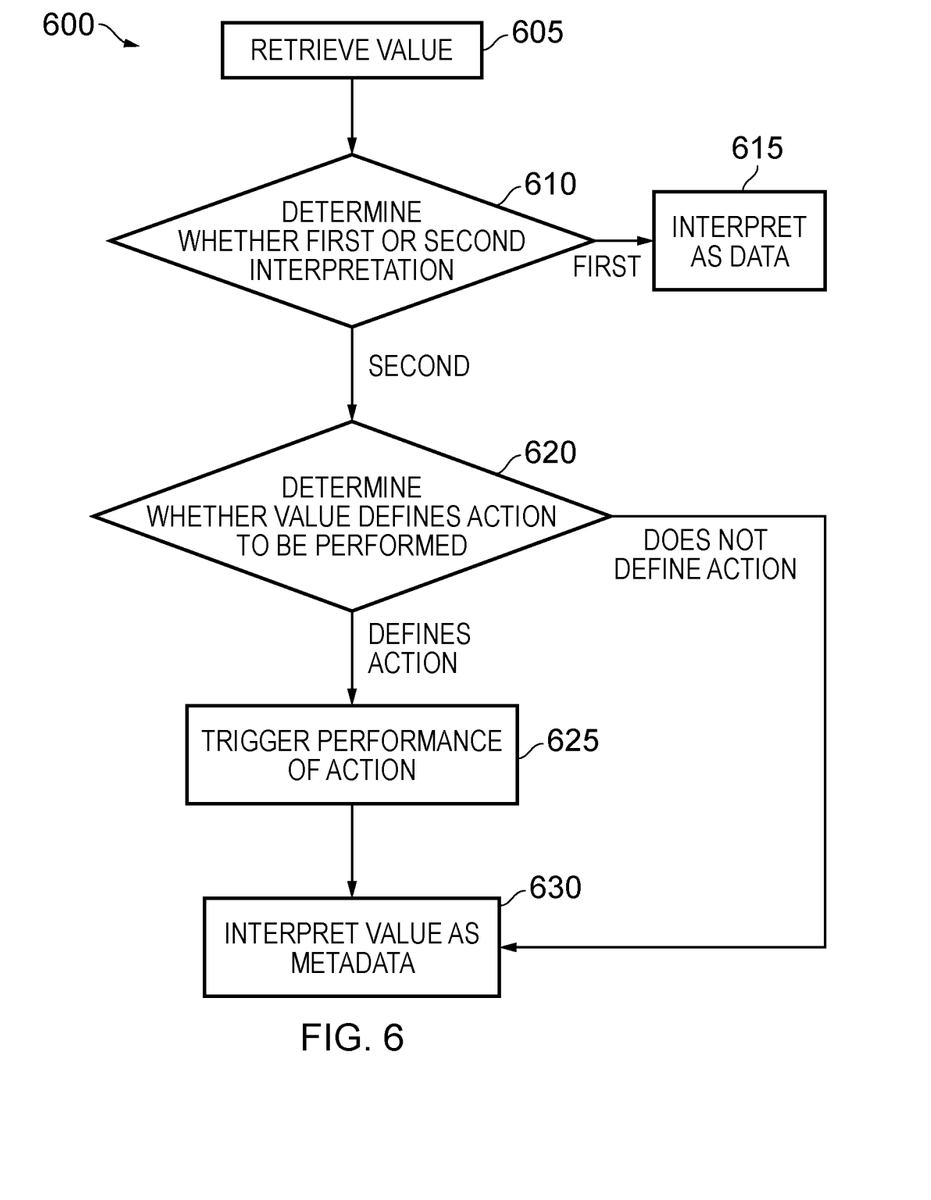
FIG. 6 shows schematically a method according to an example.

FIG. 6 shows schematically a method 600 according to examples of the present disclosure. In this example, a first interpretation of a given data value is that it represents data and a second interpretation is that it represents metadata associated with a further data value that is interpreted according to the first interpretation. The method 600 may for example be implemented in general processing circuitry or in specialised circuitry configured specifically to implement the method 600.

At block 605, a data value is retrieved from a memory location of a memory, for example as described above in relation to FIG. 1.

At block 610, it is determined whether to interpret the data value according to the first interpretation or the second interpretation. For example, the determination of block 610 may be based on a tag bit associated with the data value, as described above in relation to FIG. 3.

If it is determined that the data value is to be interpreted according to the first interpretation, flow proceeds to block 615, where the data value is interpreted as data.

If it is determined that the data value is to be interpreted according to the second interpretation, flow proceeds to block 620. At block 620, it is determined whether the data value defines an action to be performed. Particular examples of such actions, and how they could be encoded within the data value, are described elsewhere in the present disclosure. For example, the action may be an error mitigation action.

If it is determined that the data value defines an action to be performed, flow proceeds to block 625, where performance of the action is triggered.

Following performance of the action, flow proceeds to block 630. Alternatively, if it is determined at block 620 that the data value does not define an action to be performed, flow proceeds straight to block 630, skipping block 625. At block 630, the data value is interpreted as metadata.

Figure 7:
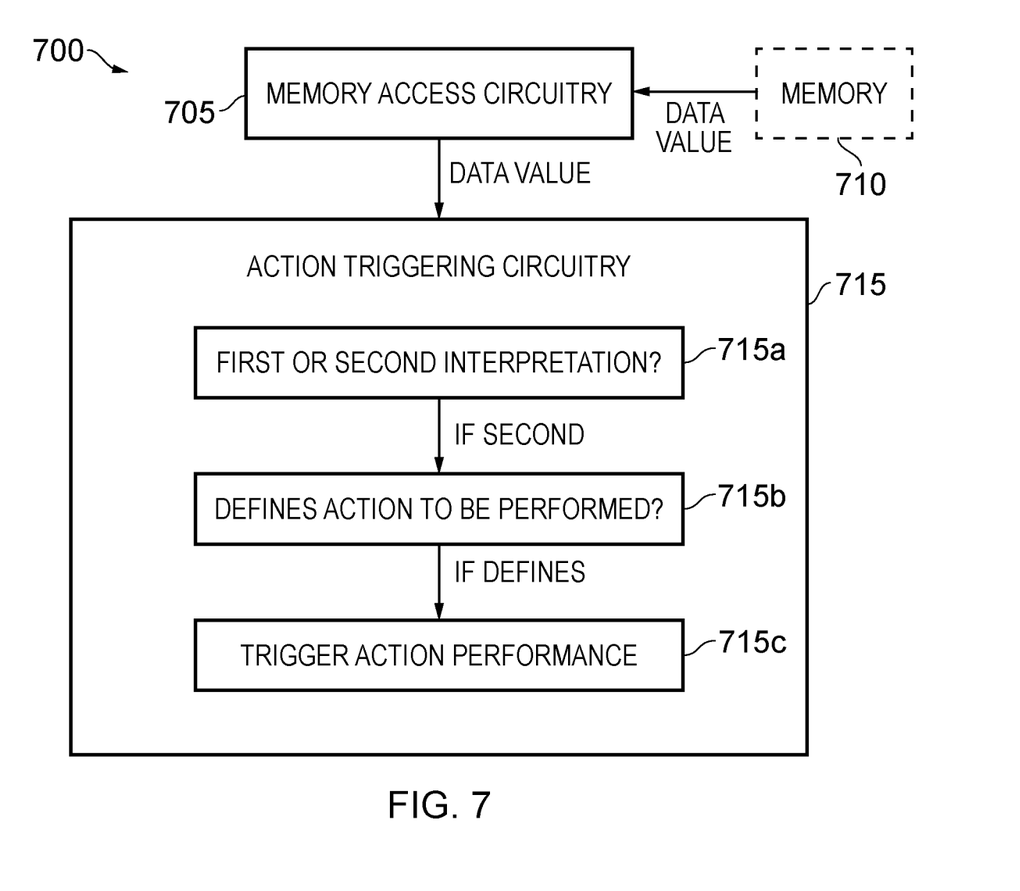
FIG. 7 shows schematically an apparatus according to an example.

FIG. 7 shows schematically an apparatus 700 according to examples of the present disclosure. Components of the apparatus may for example be implemented as routines within one or more general-purpose processing components, and/or be implemented as dedicated circuitry.

The apparatus 700 comprises memory access circuitry to retrieve a data value from a memory location of a memory 710. The memory 710 may be external to the apparatus 700.

The apparatus 700 comprises action triggering circuitry 715. The action triggering circuitry 715 receives the data value from the memory access circuitry 705.

The action triggering circuitry 715 comprises processing blocks 715a-515c.

Block 715a causes the action triggering circuitry 715 to determine whether the data value is to be interpreted according to a first interpretation or a second interpretation.

Block 715b causes the action triggering circuitry 715 to, if the data value is to be interpreted according to the second interpretation, determine whether the data value defines an action to be performed.

Block 715c causes the action triggering circuitry 715 to, if the data value defines an action to be performed, trigger performance of the action.

In this manner, the apparatus 700 is configured to perform methods of the present disclosure.

Figure 8:
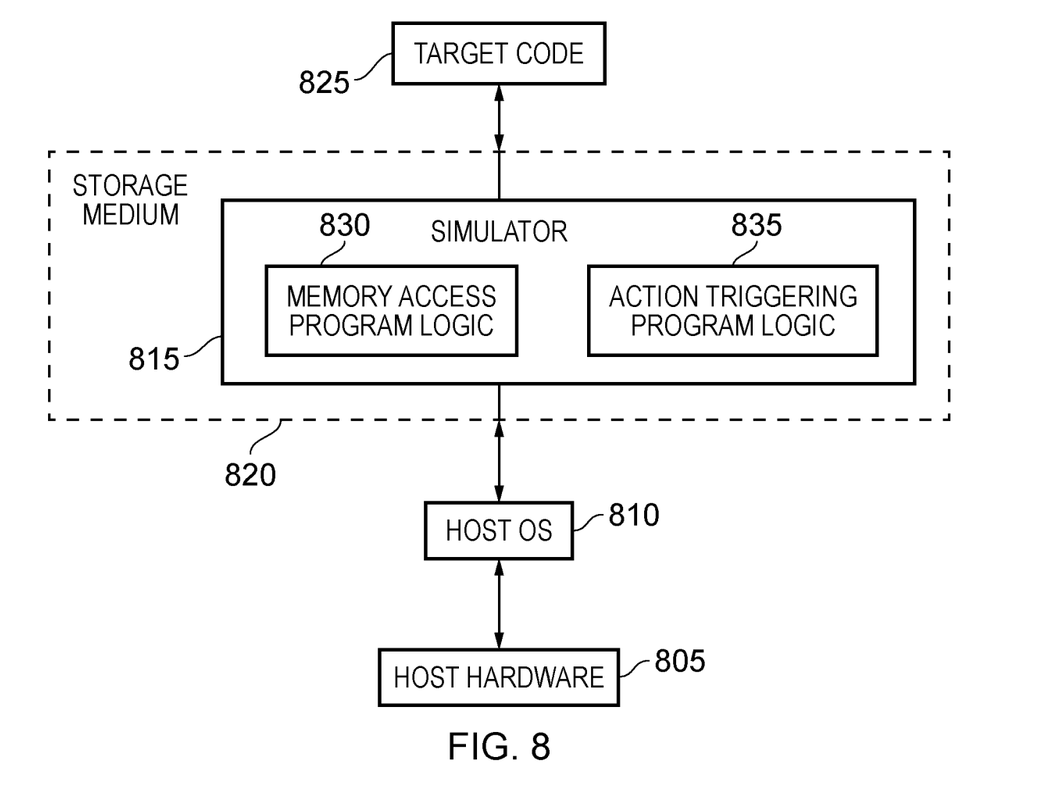
FIG. 8 shows schematically a simulator according to an example.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software-based implementation of a hardware architecture. Varieties of simulator computer programs include emulators, virtual machines, models, and binary translators, including dynamic binary translators. Typically, a simulator implementation may run on a host processor 805, optionally running a host operating system 810, supporting the simulator program 815. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 805), some simulated embodiments may make use of the host hardware, where suitable.

The simulator program 815 may be stored on a computer-readable storage medium 820 (which may be a non-transitory medium), and provides a program interface (instruction execution environment) to the target code 825 (which may include applications, operating systems and a hypervisor) which is the same as the application program interface of the hardware architecture being modelled by the simulator program 815. Thus, the program instructions of the target code 825, including the action triggering described above, may be executed from within the instruction execution environment using the simulator program 815, so that a host computer 805 which does not actually have the hardware features of the apparatus 2 discussed above can emulate these features. For example, the simulator program 815 may include memory access program logic 830 for controlling access to memory by instructions of the target code 825. For example, the memory access program logic 830 may include instructions for requesting a data value from a memory location of a memory. Also, the simulator program 815 may include action triggering program logic 835, which comprises instructions for triggering performance of an action as described in more detail in relation to the methods above.

Through use of the above described techniques, it will be appreciated that action triggering functionality can be implemented in a data processing system, whilst circumventing the disadvantages of comparative systems in which data watchpoints and/or address watchpoints are implemented. Furthermore, the impact on execution flow can be reduced or eliminated.

Methods described herein may be performed in hardware and/or software. Such hardware may be a general-purpose processor, or a more specific unit such as an application-specific integrated circuit or a field-programmable gate array.

Although illustrative examples of the invention have been described in detail herein with reference to the accompanying drawings, it is to be understood that the invention is not limited to those precise examples, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
    memory access circuitry to retrieve a data value from a memory location of a memory; and
    action triggering circuitry to:
        determine whether the data value is to be interpreted according to a first interpretation or a second interpretation based on a control value associated with the memory location, wherein the first interpretation is that the data value is data and the second interpretation is that the data value is non-data; and
        when it is determined that the data value is to be interpreted according to the second interpretation:
            determine whether the data value defines an action to be performed; and
            when it is determined that the data value defines an action to be performed, trigger performance of the action.

2. An apparatus according to claim 1, wherein the action is an error mitigation action.

3. An apparatus according to claim 1, wherein the action comprises signalling an exception.

4. An apparatus according to claim 1, wherein the action comprises returning a different data value from a different memory location.

5. An apparatus according to claim 1, wherein the action comprises updating a diagnostic record.

6. An apparatus according to claim 1, wherein:
    the memory access circuitry is configured to retrieve the data value in response to an attempted write to the memory location; and
    the action comprises:
        determining that a processor operating state associated with the attempted write to the memory location is a prohibited operating state; and
        in response to the determining that the operating state is the prohibited operating state, prohibiting the attempted write.

7. An apparatus according to claim 6, wherein the operating state is at least one execution privilege level.

8. An apparatus according to claim 1, wherein the control value is stored in a control value memory location, the control value memory location being within a region of the memory allocated for control value storage.

9. An apparatus according to claim 1, wherein the control value is stored in a control value memory location associated with the memory location.

10. An apparatus according to claim 9, wherein the control value memory location is adjacent to the memory location.

11. An apparatus according to claim 1, wherein the action triggering circuitry is to trigger the action when the data value at least partially matches one of one or more predefined values.

12. An apparatus according to claim 1, wherein the second interpretation is that the data value is metadata relating to a data value stored in a further memory location different from the memory location, the data value stored in the further memory location being interpreted according to the first interpretation.

13. An apparatus according to claim 12, wherein:
    the data value stored in the further memory location comprises a pointer value of a bounded pointer; and
    the metadata comprises bounds for the bounded pointer.

14. An apparatus according to claim 13, wherein the action triggering circuitry is to:
    determine that the pointer value is outside the bounds; and
    in response to determining that the pointer value is outside the bounds, signal an exception.

15. An apparatus according to claim 12, wherein the metadata comprises an error correcting code associated with the data stored in the further memory location.

16. A method comprising:
    retrieving a data value from a memory location of a memory;
    determining whether the data value is to be interpreted according to a first interpretation or a second interpretation based on a control value associated with the memory location, wherein the first interpretation is that the data value is data and the second interpretation is that the data value is non-data; and
    based on determining that the data value is to be interpreted according to the second interpretation:
        determining whether the data value defines an action to be performed; and
        based on determining that the data value defines an action to be performed, triggering performance of the action.

17. A non-transitory, computer-readable storage medium storing a computer program for controlling a host data processing apparatus to provide an instruction execution environment for execution of instructions of target program code, comprising:
    memory access program logic to request a data value from a memory location of a memory; and
    action triggering program logic to:
        determine whether the data value is to be interpreted according to a first interpretation or a second interpretation based on a control value associated with the memory location, wherein the first interpretation is that the data value is data and the second interpretation is that the data value is non-data; and based on determining that the data value is to be interpreted according to the second interpretation:
  determine whether the data value defines an action to be performed; and
  based on determining that the data value defines an action to be performed, trigger performance of the action.

* * * * *